(12) United States Patent
Bhattacharja

(10) Patent No.: US 9,227,241 B2
(45) Date of Patent: Jan. 5, 2016

(54) INVESTMENT CASTING SHELLS HAVING AN ORGANIC COMPONENT

(75) Inventor: Sankar Bhattacharja, Naperville, IL (US)

(73) Assignee: Nalco Company, Naperville, IL (US)

( * ) Notice: Subject to any disclaimer, the term of this patent is extended or adjusted under 35 U.S.C. 154(b) by 641 days.

(21) Appl. No.: 12/963,311

(22) Filed: Dec. 8, 2010

(65) Prior Publication Data

US 2012/0148736 A1 Jun. 14, 2012

(51) Int. Cl.
*B22C 1/08* (2006.01)
*B22C 9/04* (2006.01)
*C08L 97/02* (2006.01)

(52) U.S. Cl.
CPC ... *B22C 1/08* (2013.01); *B22C 9/04* (2013.01); *C08L 97/02* (2013.01); *C08L 2205/02* (2013.01)

(58) Field of Classification Search
CPC ............. B22C 1/08; B22C 9/04; C08L 97/02; C08L 2205/02
USPC ................................................ 523/139, 148
See application file for complete search history.

(56) References Cited

U.S. PATENT DOCUMENTS

| | | | |
|---|---|---|---|
| 4,063,954 A | 12/1977 | Brown | |
| 4,069,859 A | 1/1978 | Nagai et al. | |
| 4,247,333 A | 1/1981 | Ledder et al. | |
| 4,260,452 A * | 4/1981 | Kruger et al. | 162/23 |
| 4,530,722 A | 7/1985 | Moore et al. | |
| 4,572,272 A | 2/1986 | Mills | |
| 4,925,492 A | 5/1990 | Kelkar et al. | |
| 5,280,819 A | 1/1994 | Newkirk et al. | |
| 5,297,615 A | 3/1994 | Aimone et al. | |
| 5,569,320 A | 10/1996 | Sasaki et al. | |
| 5,582,681 A * | 12/1996 | Back et al. | 162/5 |
| 6,000,457 A | 12/1999 | Vandermeer | |
| 6,257,316 B1 | 7/2001 | Vandermeer | |
| 6,450,243 B1 | 9/2002 | Shaw et al. | |
| 6,540,013 B1 | 4/2003 | Doles | |
| 7,004,230 B2 | 2/2006 | Vandermeer et al. | |
| 7,503,379 B2 | 3/2009 | Batllo et al. | |
| 8,235,092 B2 | 8/2012 | Scott | |
| 2003/0131966 A1 | 7/2003 | Duffy et al. | |
| 2003/0168200 A1 | 9/2003 | Vandermeer | |
| 2004/0069429 A1 * | 4/2004 | Tsuura et al. | 162/218 |
| 2004/0238158 A1 | 12/2004 | Vandermeer et al. | |
| 2005/0199366 A1 | 9/2005 | Vandermeer et al. | |
| 2005/0252632 A1 | 11/2005 | Vandermeer et al. | |
| 2006/0081350 A1 | 4/2006 | Batllo et al. | |
| 2007/0151702 A1 | 7/2007 | Batllo | |
| 2008/0105401 A1 * | 5/2008 | Nakai et al. | 164/520 |
| 2011/0049041 A1 * | 3/2011 | Yonemoto | 210/490 |
| 2011/0114279 A1 * | 5/2011 | Scott | 164/24 |

FOREIGN PATENT DOCUMENTS

| | | |
|---|---|---|
| EP | 1207975 B1 | 12/2004 |
| JP | 03258438 A | 11/1991 |
| JP | 2003-507189 | 2/2003 |
| JP | 2008-534286 | 8/2008 |

OTHER PUBLICATIONS

BIO-TERGE AS-40 Product Bulletin, Stepan company, Aug. 2012, pp. 1-2, obtained from http://www.stepan.com/pdfs/Bulletins/BIOTERGEAS40.pdf.*
CEDEPHOS FA-600 MSDS, Vopak USA Inc, pp. 1-3 (2001), obtianed online from http://www.sfm.state.or.us/CR2K_SubDB/MSDS/CEDEPHOS_FA_600.TXT.*
Richard J. Lewis, Sr. "Hawley's Condensed Chemical Dictionary, 12th Edition", John Wiley & Sons, Inc., New York p. 19.*
Peter A. Lewis "Pigment Handbook vol. I: Properties and Economics, 2nd Edition", John Wiley & Sons, New York , p. 162 (1988).*
Finley, Printing Paper and Ink, Delmar Published, New York, (1997), pp. 46-47 and 54.*
Richard J. Lewis, Sr. "Hawley's Condensed Chemical Dictionary, 12th Edition", John Wiley & Sons, Inc., New York p. 19 (1993).*
Mini-Fibers MSDS pp. 1-2, obtained online from http://www.minifibers.com/MSDS/MSDS_ShortStuff_PEFYB.pdf.*

* cited by examiner

*Primary Examiner* — Alexander Kollias
(74) *Attorney, Agent, or Firm* — Leydig, Voit & Mayer, Ltd.

(57) ABSTRACT

A composition for use in investment casting shells and a method of making the composition is disclosed. The composition includes an engineered binder and a refractory flour. The engineered binder comprises a siliceous material and at least one organic component selected from: at least one type of wood pulp; at least one species of cellulose fiber; and combinations thereof. A particular benefit of the investment shell composition is simultaneously increased permeability and load bearing capacity.

15 Claims, No Drawings

INVESTMENT CASTING SHELLS HAVING AN ORGANIC COMPONENT

TECHNICAL FIELD OF THE INVENTION

This invention relates generally to novel compositions for use in investment casting. More specifically, the invention relates to such compositions comprising an organic component added to the binder or slurry which provides improved characteristics. The invention has particular relevance to the production of investment casting shells having an organic component that exhibit increased permeability and higher load bearing capacity.

BACKGROUND OF THE INVENTION

Investment casting, which is also known as lost wax, lost pattern, and precision casting, is used to produce high quality jointless metal articles that meet relatively close dimensional tolerances. Typically, an investment casting is made by first fabricating a thin-walled ceramic mold as a negative of the article to be made. Molten metal is then introduced to this mold, which is also known as an investment casting shell. Shells are constructed by first making a facsimile or pattern from a disposable substrate of the metal object to be made by investment casting. Suitable meltable substrate materials include, for example, wax, polystyrene, or some plastics. Other disposable materials that vaporize or burn off completely are also used to form these patterns.

A ceramic shell is then formed around the disposable pattern. This shell formation is accomplished first by dipping the pattern into slurry made of a mixture of liquid refractory binders such as colloidal silica or ethyl silicate, and a refractory powder such as quartz, fused silica, zircon, alumina, and aluminosilicate. Then, relatively coarser dry refractory grains, known as stucco, are sifted on the freshly dipped pattern and air-dried. The process of dipping, stuccoing, and air-drying is repeated until a desired thickness is achieved. The shells are built up to a thickness in the range of ⅛ to about ½ inch. No stucco is commonly applied to the final slurry coat, called the seal coat. The green shell is then thoroughly air-dried.

The disposable pattern is then removed using methods that do not exert excessive pressure to the green shell, which commonly include steam autoclaving and flash firing. During autoclaving and flash firing, the pattern is melted away leaving only the shell and any residual substrate material. The shell is then heated to a temperature high enough to combust the residual organic substrate material and sinter the ceramic mold. The hot mold is then filled with molten metal. Various methods are used to introduce molten metal into shells including gravity, pressure, vacuum, and centrifugal force. When the metal in the casting mold has solidified and the shell has cooled sufficiently, the ceramic mold is broken away and the casting is separated.

Investment casting has been practiced for generations. But its continuous growth stems from the demand for producing more complicated parts with intricate design. This demand is driving the industry to develop new ways to make investment casting shells that generate fewer defects and can be produced with higher efficiency and cost effectiveness. Such efforts have resulted in the development of engineered shell systems and the addition of polymers, fibers, and other additives that have significantly improved the quality of the shells produced today. For example, the wide distribution refractory flour system has increased the slurry solids content thereby reducing drying time with improved shell strength. Fiber addition made it possible to build corners and edges more uniformly. Polymer addition has reduced pre-fire shell cracking from drying and handling. Most of these improvements are concentrated on the refractory flour. With exception to polymer addition, the same binders have been used in investment casting for the last several decades.

Polymer, glass, and ceramic fibers currently used in investment casting shells help build uniform edges with virtually no increase in shell strength and permeability. The bond between these fibers and the matrix is primarily physical and relatively weak. The engineered flour systems often use wide size distribution flour particles, which allow raising the slurry solids and produce relatively dense shells with comparatively lower permeability. Currently, a small amount of coarser microsilica is added to build thicker shell and improve permeability, which diminishes some shell strength. Shell strength and permeability inversely affect shell physical properties.

There thus exists and industrial need for investment casting shells having increased shell strength and improved permeability.

SUMMARY OF THE INVENTION

The present invention accordingly provides an engineered binder having an organic additive that chemically bonds with a siliceous component to help create the final investment casting shell composite of refractory flour and engineered binder.

Such chemical bonding between the engineered binder and the organic additive significantly strengthens the binder-flour composite, while imparting the benefits of uniform edge building (currently obtained from plastic or glass fiber addition) and improved shell permeability.

In an aspect, this invention is a composition for use in investment casting shells. The composition includes two essential components of an engineered binder and refractory flour. Within the engineered binder is at least one type of wood pulp, at least one species of cellulose fiber, or a combination thereof.

In another aspect, the present invention is a method of forming a composition for use in investment casting shells. The method includes coating an expendable pattern with a refractory slurry to create a coated pattern; stuccoing the coated pattern to create a first layer; drying the first layer sufficiently to apply another coat of refractory slurry and coating with stucco to create a second layer; and optionally repeating the preceding steps at least once to create subsequent layers; wherein at least one of said layers comprises the at least one organic component.

It is an advantage of the invention to provide a novel investment casting shell composition that includes an organic component.

It is another advantage of the invention to provide a novel investment casting shell composition that simultaneously displays increased permeability, higher load bearing capacity, and equal or better dewaxing performance compared to currently available commercial slurries.

It is a further advantage of the invention to provide investment-casting slurries that are thixotropic and perform unexpectedly better than the current commercial slurries, including slurries having fibers and those that are fiber-free and those containing microsilica or without microsilica.

It is yet another advantage of the invention to provide improvements imparted in building investment casting shell molds including uniformity in thickness, more rapid shell building, excellent coverage in holes, corners, and details of the casting parts, with equal or reduced drainage time compared to currently offered commercial slurries made with or without the fibers and microsilica.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims

DETAILED DESCRIPTION OF THE INVENTION

The present invention is directed toward an engineered binder system for investment casting applications that is preferably present in an investment casting shell in a range from about 5 wt % to about 50 wt %. Investment casting binder can be a number of different siliceous materials further being blended with, for example, a polymer according to embodiments. In accordance with the invention, at least one organic additive is used to engineer the binder system. The presence of the organic additive simultaneously increases shell tensile strength and load bearing capacity while improving shell permeability, which is contrary to commonly observed behavior and one having skill in the art would not expect these two characteristics to coexist. Shell strength and shell permeability are known in the art to be inversely related. Shells having higher open porosity are expected to be more permeable with a simultaneous loss of tensile properties.

The tensile strength enhancement is thought to be derived from the hydrogen bonding between the silica and cellulose of the organic additive. In various embodiments of the invention, the organic additive may be at least one type of wood pulp or at least one species of cellulose or cellulosic material. Wood pulps, in particular, offer unique topochemical and structural properties that are well-suited for use in many products. They typically have layered structures of heterogeneously distributed cellulose, hemicelluloses, lignin, and other minor components. The cellulose is organized into both crystalline and amorphous regions that are generally oriented longitudinally along the long axis of the fibers. The cellulose regions are surrounded by hemicelluloses that act as a buffer between the crystalline areas and to maintain ductility.

For example, dry wood pulp is comprised of hollow cellulose fibers having chemically active inner and outer surfaces that imbibe colloidal silica or binder and chemically bond with silica both within the core and the outer surface. In addition to the chemical anchoring, cellulose also physically bonds to the matrix. However, such chemical anchoring is absent for the organic and inorganic synthetic fibers currently used in investment casting. These latter fibers have only outer surfaces that are available for bonding. Additionally, the swelling nature of cellulose makes the slurry equally or more thixotropic than the engineered shell systems currently used, while simultaneously resulting in thicker shells with equal or more uniform edges. During heating, the cellulose fibers are burned off leaving a cylindrical hollow core that also improves shell permeability. These benefits are mutually exclusive and not available in any particular system currently in use in the art. However, with the engineered binders system of the invention, these benefits are simultaneously and unexpectedly achieved in a single system.

In embodiments, the wood pulp component of the engineered binder is selected from at least one of the following: hardwood pulp; softwood pulp; and combinations thereof. Wood pulps are classified into different categories based on broad species groups (e.g., hardwoods and softwoods), the type of pulping process (e.g., thermomechanical, chemi-thermomechanical, sulfite, kraft, etc.) used, and whether bleached after pulping. Pulping and bleaching selectively remove polymeric components that are present in the native wood yielding fibrous material with various polymeric compositions that are suited for various applications. Hardwoods and softwoods are most easily distinguished by the length and weighted average of the fibrous product: approximately 0.005 to 5.0 mm for hardwoods and 0.01 to 10.0 mm for softwoods. It is preferred that the hardwood fibers are 0.05 to 1.5 mm in length and softwood fibers are 0.05 to 4.0 mm in length. The diameters may vary between 2 to 60 μm for hardwood and 2 to 80 μm for softwood. It is preferred that the diameter be 5 to 40 μm for hardwood and 5 to 50 μm for softwood. Representative hardwoods include various species of Aspen, Beech, Birch, Oak, Poplar, Maple, Eucalyptus, etc. Representative softwoods include various species of Fir, Spruce, Pine, Cedar, etc. Any suitable wood pulp may be utilized in this invention and it should be appreciated that only representative types of wood pulp are described herein.

In embodiments, the wood pulp may be bleached or unbleached and pulped chemically, mechanically, or thermomechanically, chemi-thermomechanically, sulfate or kraft processes, or unpulped natural wood fibers. The wood pulp may comprise dry or wet fibers, and may be fluffed, powdery, or in the form of board. In alternative forms, the wood pulp may be virgin or recycled paper from newspaper, copy and printing papers, magazines, and boards of different kinds known in the art.

In embodiments, the cellulose fiber species is selected from at least one of the following: bamboo; cotton; cotton linters; bagasse; esparto; kenaf; jute; hemp; papyrus; flax; sisal; straw; rice; wheat; maize-derived cellulose; the like; and combinations thereof. The average length of the fibrous cellulose generally varies between about 0.005 mm and about 100 mm and average diameter typically varies between about 1 and about 100 μm. Cellulose and hemicellulose fibers can be non-naturally occurring. These fibers are not typically formed in nature, but are derived through various chemical processes known in the art. As an example, cellulose in naturally occurring wood pulp can be solubilized and spun into fibers. A similar process can be used to form hemicellulose fibers. Although derived from natural material, these fibers are non-natural as they are not normally found in nature in this form.

The organic component is preferably present in the engineered binder in a range from about 0.05 wt % to about 30 wt %. Preferably, the organic component of wood pulp and/or cellulose fiber is present in an amount sufficient to make the refractory slurry thixotropic, build uniformly thicker investment casting shells, improve permeability, and increase load-bearing capacity. In various embodiments, the organic component is present from about 0.05 wt % to about 15 wt %, but may also be used at levels ranging from about 0.1 wt % to about 1 wt %. Fibers in the organic component typically have an average length from about 0.005 mm to about 100 mm or from about 0.01 mm to about 20 mm, and an average diameter from about 1 μm to about 100 μm.

In embodiments, the wood pulp or cellulose fiber of the engineered binder also comprises at least one other fiber selected from the following: at least one organic fiber; at least one inorganic fiber; the like; and combinations thereof. Representative other fibers include polypropylene; nylon; rayon; ceramic; glass; the like; and combinations thereof.

In embodiments, the engineered binder further comprises at least one of the following: at least one polymer; at least one biocide; at least one fungicide; at least one defoamer; at least one dispersant; water; the like; and combinations thereof.

In embodiments, dried pulp is used that is either fluffy or in the form of thick boards (sometimes referred to as market pulp). When suspended in water, colloidal silica with or without polymer, or in investment casting slurries, such dried pulp imbibes the surrounding liquid, swells, and disperses. That is, market pulp is repulped in such a process. Although repulping in colloidal or colloidal-polymer blend is preferred, wood pulp improves shell characteristics at varying degrees irrespective of the process used in introducing it to the slurry.

According to alternative embodiments, the siliceous material components may be selected from at least one of the following: colloidal silica; a blend of colloidal silica and a polymer; a blend of colloidal silica, a polymer, and water; colloidal silica and water; the like; and combinations thereof. In a case where colloidal silica is selected as the siliceous material, the colloidal silica comprises at least one of the following: ethyl silicate; fumed silica; ionic silicates; precipitated silica; the like; and combinations thereof.

In embodiments where a polymer is used in the investment casting shell, the polymer may be selected from at least one polymer comprising at least one of the following monomers: acrylic acid; acrylic esters; methacrylic acid; methacrylic esters; styrene butadiene; vinyl chloride; vinyl acetate; the like; and combinations thereof.

In embodiments, the refractory slurry, flour, and/or the stucco comprises the organic component.

In an embodiment, the refractory slurry is thixotropic in at least one layer.

In various embodiments, the investment casting shell is formed through at least one of the following steps: (i) mixing the siliceous material and the at least one organic component; (ii) mixing the at least one organic component with a slurry, wherein the at least one organic component is present in the slurry from about 0.01 wt % to about 20 wt %, based on a total mass of the slurry; and (iii) mixing the at least one organic component with the refractory flour to form a blend followed by adding the blend to a slurry, wherein the at least one organic component is present in the slurry from about 0.01 wt % to about 20 wt %, based on a total mass of the mixed slurry; (iv) mixing the at least one organic component with a polymer to form a polymer blend followed by adding the polymer blend to a slurry, wherein the at least one organic component is present in the slurry from about 0.01 wt % to about 20 wt %, based on a total mass of the slurry; and (v) repulping the at least one organic component in an aqueous solvent followed by adding the repulped organic component to a slurry, wherein the at least one organic component is present in the slurry from about 0.01 wt % to about 20 wt %, based on a total mass of the slurry; or any combination thereof.

In an embodiment, the investment casting shell is formed through the following method: (i) coating an expendable pattern with a refractory slurry to create a coated pattern; (ii) stuccoing the coated pattern to create a first layer; (iii) drying the first layer sufficiently to apply another coat of refractory slurry and coating with stucco to create a second layer; and (iv) optionally repeating the preceding steps at least once to create subsequent layers; wherein at least one of said layers comprises the at least one organic component. The foregoing steps (i) to (iv) are repeated until a desired thickness is achieved for the investment casting shell.

The organic component may be introduced into the engineered binder prior to making slurry. It can also be introduced directly to the slurry to partially attain the characteristics of the shells made with engineered binder system. Alternatively, it can be introduced into the slurry by other means generally known to those skilled in the art, such as dry blending with refractory flour, blending with stucco, blending with polymer or spraying directly after dipping.

Refractory flour for use in the present invention may be any suitable refractory flour as known in the art. Typically, refractory flour comprises a particle size from about 0.5 µm to about 1 mm. Representative refractory flour comprises at least one of the following: fused silica; aluminosilicate; alumina; zirconium silicate; microsilica; zirconia; yttira; quartz; carbon; and combinations thereof.

In an embodiment, the investment casting shell mold of the invention comprises an organic component (e.g., wood pulp or cellulose fibers) wherein the green shell is built by successive coating of slurry and stucco wherein the wood pulp or cellulose fibers are present at a level that effectively makes the slurry thixotropic, builds uniformly thicker shells, improves permeability, and increases load-bearing capacity.

In embodiments, an expendable pattern is repeatedly coated with slurry and stucco wherein the flour contains an organic component (e.g., wood pulp or cellulose fibers). In other embodiments, an expendable pattern is repeatedly coated with slurry and stucco wherein the stucco contains an organic component (e.g., wood pulp or cellulose fibers).

In alternative embodiments, the investment casting shell of the invention is made with at least one slurry layer containing the engineered binder made with wood pulp or cellulose fibers; with at least one slurry layer containing refractory flour that has wood pulp or cellulose fibers; with at least one stucco layer containing wood pulp or cellulose fibers; or any combination thereof.

The foregoing may be better understood by reference to the following examples, which are intended for illustrative purposes and are not intended to limit the scope of the invention or its application in any way. The examples given below include both laboratory-scale and plant-scale evaluations. Both evaluations are conducted with widely used commercial engineered flour systems as controls.

EXAMPLE 1

Investment casting slurries were prepared by mixing binder (a blend of colloidal silica and styrene butadiene (SBR) latex) and silica flour to which dry fluffy pulp was added. Three slurries made with the same binder are shown in this example. Slurry 1-1 was the control made with Gray Matter (GM) II flour, which is a commercially available wide distribution fused silica flour system containing coarse microsilica and synthetic organic fibers as additives. Coarse microsilica addition improves shell permeability and fiber addition builds better corners and edges. This investigation was conducted to evaluate wide distribution flour systems containing wood pulp without microsilica and synthetic fibers. Slurry 1-2 was made with the same fused silica flour system and synthetic organic fibers as in GM II but without the microsilica. Slurry 1-3 was made with the same fused silica flour as in GM II but without the synthetic organic fibers and microsilica. Dry wood pulp was gradually added directly to Slurries 1-2 and 1-3 until the slurry viscosity and plate weights were matched with that of Slurry 1-1.

TABLE 1

Slurry Formulation

| | Slurry formulation* (wt. %) | | |
|---|---|---|---|
| | Slurry 1-1 (GM II control) | Slurry 1-2 | Slurry 1-3 |
| Binder | 36.0 | 36.4 | 36.8 |
| Silica flour | 63.8 (with microsilica) | 63.3 (no microsilica) | 63.0 (no microsilica) |
| Synthetic organic fibers | 0.2 | 0.2 | — |
| Dry softwood pulp | — | 0.1 | 0.2 |
| Total solids in slurry | 75.7 | 75.4 | 75.2 |

*Viscosity of all three slurries was maintained the same.

Tensile properties and permeability of the shells made with these three slurries were measured. Tensile properties were evaluated by measuring the modulus of rupture (MOR) of shells built on expendable wax patterns (6 in. length, 1 in. width, and 0.125 in. thickness). Multiple bars were prepared for each of the three slurries without a prime coat and shell tensile strengths were measured in two conditions. Green strength was measured on air-dried shells at room temperature. Hot strength was measured in hot conditions after the shells were heated at 982° C. for one hour. Shell permeability was measured by building shells on expendable Ping-Pong balls attached to quartz tubes. Like MOR bars, multiple permeability balls were built with the same number of coats and without a prime coat. The balls were heated to 982° C. for one hour when nitrogen gas was passed through the quartz tube at various pressures and nitrogen flow through the shells was measured.

Green and hot MOR, AFL (adjusted fractured load, the breaking load at fracture normalized for one inch sample width), shell thickness, and dry shell weight are shown in Table 2. Shell permeability results are shown in Table 3. A higher MOR value was achieved for samples with higher tensile strength, an important shell characteristic. However, AFL is even more important, as it is the load that a shell can withstand before breaking. AFL is especially critical to prevent leaks when hot liquid metal is poured for casting. Higher the flow meter readings indicate higher shell permeability. These two characteristics are particularly desirable in investment casting shells.

The data show that the addition of the wood pulp increased shell strength and simultaneously improved the permeability. Shell strength normally decreases as it becomes more permeable thus the observed result was surprising and unexpected. The control slurry (GM II) was engineered with microsilica for improved shell build with higher permeability. However, the presence of wood pulp enhanced shell strength significantly while improved permeability and shell build of the flour system that was otherwise less permeable with poor shell build.

TABLE 2

Shell Physical Properties

| | Green Strength | | Hot Strength | | | |
|---|---|---|---|---|---|---|
| Slurry Formulation | MOR, psi | AFL, lb | MOR, psi | AFL, lb | Thickness, in. | Dry shell wt., g |
| Slurry 2-1 (control) | 660 | 19.6 | 1270 | 35.5 | 0.29 | 269.8 |
| Slurry 2-2 | 920 | 27.9 | 1420 | 39.6 | 0.30 | 271.7 |
| Slurry 2-3 | 890 | 27.6 | 1550 | 47.9 | 0.31 | 263.3 |

MOR = Modulus of rupture, AFL = Adjusted fracture load (fracture load at unit width)

TABLE 3

Shell Permeability at 982° C.

| | Pressure of $N_2$ gas, psi | | | | |
|---|---|---|---|---|---|
| | 0.5 | 1.0 | 1.5 | 2.0 | 2.5 |
| | Average Flow Meter Readings | | | | |
| Slurry 2-1 (control) | 31.0 | 47.8 | 62.0 | 73.5 | 88.0 |
| Slurry 2-2 | 41.6 | 62.1 | 78.3 | 100.0 | |
| Slurry 2-3 | 41.3 | 60.9 | 78.3 | 96.8 | |

EXAMPLE 2

The samples in this example were prepared by adding dry fluffy wood pulp to the slurry, as in Example 1. This investigation evaluates performance of shells containing softwood pulp in the presence and absence of synthetic fibers. Evaluation of hardwood pulp is also introduced in this example. Like in Example 1, the flour in Slurry 2-1 was again GM II as control. Slurries 2-2 and 2-4 made with softwood pulp were similar to that in Example 1. Slurry 2-3 was made with dried hardwood pulp. The physical properties were again very similar to those in Example 1. The slurry and shell physical characteristics are shown in Tables 5 through 7. Shells made with both softwood and hardwood pulps performed very similarly, although their respective amounts in the slurry were slightly different. These shells were made without a prime coat.

TABLE 4

Slurry Formulation

| | Slurry formulation* (wt. %) | | | |
|---|---|---|---|---|
| | Slurry 2-1 (GM II control) | Slurry 2-2 | Slurry 2-3 | Slurry 2-4 |
| Binder | 35.9 | 36.1 | 36.1 | 36.6 |
| Silica flour | 63.9 (with microsilica) | 63.6 (without microsilica) | 63.5 (without microsilica) | 63.2 (without microsilica) |
| Synthetic organic fibers | 0.2 | 0.2 | 0.2 | — |
| Dry softwood pulp | — | 0.1 | — | 0.2 |
| Dry hardwood pulp | — | — | 0.2 | — |
| Total solids in slurry | 75.5 | 75.3 | 75.3 | 74.9 |

*Viscosity of all four slurries is maintained the same

TABLE 5

Shell Properties

| Slurry Formulation | Green strength MOR psi | Green strength AFL lbs | Fired strength MOR psi | Fired strength AFL lbs | Hot strength MOR psi | Hot strength AFL, lbs | Thickness, in. | Dry shell wt. g |
|---|---|---|---|---|---|---|---|---|
| Slurry 2-1 (control) | 721 | 22.1 | 515 | 14.0 | 1331 | 34.4 | 0.30 | 256 |
| Slurry 2-2 | 937 | 27.7 | 875 | 25.0 | 1619 | 46.0 | 0.30 | 249 |
| Slurry 2-3 | 954 | 25.8 | 833 | 24.7 | 1502 | 40.7 | 0.29 | 260 |
| Slurry 2-4 | 978 | 32.7 | 783 | 24.8 | 1602 | 49.8 | 0.32 | 238 |

TABLE 6

Shell Permeability (flow of nitrogen through the shell) at 982° C.

| | Pressure of $N_2$ gas, psi | | | | |
|---|---|---|---|---|---|
| | 0.5 | 1.0 | 1.5 | 2.0 | 2.5 |
| | Average Flow Meter Readings | | | | |
| Slurry 2-1 (control) | 39.3 | 57.9 | 74.6 | 95.7 | — |
| Slurry 3-1 | 43.9 | 65.5 | 84.1 | >100 | — |
| Slurry 3-3 | 45.1 | 66.8 | 88.0 | >100 | — |
| Slurry 3-4 | 40.0 | 59.1 | 75.0 | 96.1 | — |

EXAMPLE 3

The pulp addition process in this example was different from Examples 1 and 2. Both hardwood and softwood were repulped in either colloidal or binder (a mixture of colloidal and SBR latex). Flour was then added to the binder containing the pulp and mixed to prepare the slurry. When repulped in colloidal silica, an equivalent amount of polymer was added to the slurry and achieved a similar slurry formulation. This evaluation compared repulping in colloidal vs. binder followed by flour addition. The slurry and shell physical characteristics are shown in Tables 7 through 9. These were backup shells without a primer coat. The observed characteristics were similar to those of the cellulose systems shown above in Examples 1 and 2.

TABLE 7

Slurry Formulation

| | Slurry formulation* (wt. %) | | | |
|---|---|---|---|---|
| | Slurry 3-1 | Slurry 3-2 | Slurry 3-3 | Slurry 3-4 |
| Binder | 37.6 | 36.5 | 35.6 | 35.9 |
| Fused silica flour | 62.2 | 63.2 | 64.2 | 63.8 |
| Softwood repulped in binder | 0.2 | | | |
| Hardwood repulped in binder | | 0.3 | | |
| Softwood repulped in colloidal | | | 0.2 | |
| Hardwood repulped in colloidal | | | | 0.3 |
| Total solids in slurry | 74.6 | 75.4 | 76.0 | 75.8 |

*Viscosity of all four slurries is maintained the same

TABLE 8

Shell Properties

| Slurry Formulation | Green strength MOR psi | Green strength AFL lbs | Hot strength MOR psi | Hot strength AFL, lbs | Thickness, in. | Dry shell wt. g |
|---|---|---|---|---|---|---|
| Slurry 3-1 | 940 | 35.3 | 1596 | 53.1 | 0.32 | 253 |
| Slurry 3-2 | 963 | 32.2 | 1698 | 53.9 | 0.31 | 256 |
| Slurry 3-3 | 977 | 32.1 | 1702 | 48.9 | 0.30 | 244 |
| Slurry 3-4 | 979 | 30.3 | 1621 | 49.8 | 0.30 | 258 |

TABLE 9

Shell Permeability (flow of nitrogen through the shell) at 982° C.

| | Pressure of $N_2$ gas, psi | | | | |
|---|---|---|---|---|---|
| | 0.5 | 1.0 | 1.5 | 2.0 | 2.5 |
| | Average Flow Meter Readings | | | | |
| Slurry 3-1 | 41.4 | 65.4 | 87.6 | >100 | |
| Slurry 3-1 | 38.0 | 60.0 | 78.4 | >100 | |
| Slurry 3-3 | 36.8 | 57.3 | 75.1 | 97.9 | |
| Slurry 3-4 | 38.1 | 60.5 | 79.0 | >100 | |

EXAMPLE 4

Plant evaluations were conducted to corroborate the laboratory observations and to compare the performances during autoclave and metal pouring with the existing system in the plant as control. This plant used WDS III, a fiber-free wide distribution engineered fused silica flour system that contains coarse microsilica as an additive for improved shell permeability. The binder for the control slurry was a blend of large particle colloidal silica and SBR latex.

Performance of two test slurries was evaluated in this trial. The flour in these two slurries was the same wide distribution fused silica system used for control but without the microsilica additive. The binders for the two slurries were different—softwood was repulped in one and hardwood in another. The base binder was the same for all three slurries. The viscosity of all three slurries was kept identical during shell building. These slurries were used only for backup and seal coats. The prime and intermediate slurries and the stuccos were identical for all parts made.

Three different parts were made in this evaluation All shells had one prime and an intermediate coat. The number of backup coats varied between 4 and 5 depending on the part, and each part had a seal coat. The slurry formulation is shown in Table 10. The physical characteristics of the shells are shown in Tables 11, 12, and 13.

TABLE 10

Slurry Formulation

| | Slurry formulation* (wt. %) | | |
|---|---|---|---|
| | Control slurry (WDS III) | Softwood repulped in binder | Hardwood repulped in binder |
| Binder | 37.3 | 37.7 | 37.5 |
| Silica flour | 62.8 (with microsilica) | 62.0 | 62.1 |
| Softwood repulped in binder | — | 0.3 | |
| Hardwood repulped in binder | | | 0.4 |
| Total solids in slurry | 74.1 | 74.2 | 74.0 |

*Viscosity of all four slurries is maintained the same

TABLE 11

Shell Properties

| | Green strength | | Fired strength | | Hot strength | | |
|---|---|---|---|---|---|---|---|
| Slurry Formulation | MOR psi | AFL lbs | MOR psi | AFL lbs | MOR psi | AFL lbs | Thickness, in. |
| WDS III | 685 | 13.1 | — | — | 1042 | 20.9 | 0.240 |
| Softwood | 733 | 17.2 | 679 | 14.3 | 1270 | 29.5 | 0.265 |
| Hardwood | 753 | 16.0 | 761 | 15.3 | 1204 | 26.6 | 0.252 |

TABLE 12

Shell Permeability (flow of nitrogen through the shell) at 982° C.

| | Pressure of $N_2$ gas, psi | | | | | |
|---|---|---|---|---|---|---|
| | 0.5 | 1.0 | 1.5 | 2.0 | 2.5 | 3.0 |
| | Average Flow Meter Readings | | | | | |
| Control | 27.1 | 44.2 | 57.7 | 71.3 | 85.0 | 96.0 |
| Softwood | 25.3 | 40.7 | 53.0 | 65.2 | 76.4 | 85.9 |
| Hardwood | 26.3 | 42.8 | 55.3 | 68.6 | 80.8 | 93.3 |

TABLE 13

Average mold mass (lb) of three parts produced in plant evaluation

| Slurry Type | Door Handles | Nail Guns | Tank Pipe |
|---|---|---|---|
| WDS III | 21.95 | 23.26 | 22.59 |
| Softwood | 23.38 | 24.69 | 24.41 |
| Hardwood | 23.09 | 24.24 | 24.04 |

TABLE 14

Autoclave crack evaluation for tank pipe parts

| Slurry Type | Cracks per part | Average length per crack, in. |
|---|---|---|
| WDS III | 1.00 | 8.3 |
| Softwood repulped in binder | 0.90 | 6.7 |
| Hardwood repulped in binder | 0.95 | 7.6 |

The data presented from the plant evaluation clearly showed the following advantages of using wood pulp in investment casting: (i) wood pulp produced thicker shells resulting in faster shell build. This is also reflected by the higher mold mass in the presence of wood pulp; (ii) shells containing wood pulp were stronger as shown by higher MOR and AFL; (iii) similarities in permeability of all three shells supports the concept that imperviousness of the prime coat determines the overall shell permeability as all shells in the evaluation had one identical prime coat; (iv) the lab-made shells containing wood pulp made without prime coats were more permeable, as shown in the Examples 1 and 2; (v) the superior physical characteristics corroborate the observation of shorter and less cracking during autoclaving; and (vi) no shells leaked during metal pouring and knockout was identical for all three types of shell.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A composition for use in investment casting consisting of:
    an engineered binder comprising colloidal silica, a polymer, wood pulp, and water; and
    refractory flour;
    wherein the engineered binder is present in the composition at a concentration of from about 5 wt % to 38 wt % based on the composition, and
    the wood pulp comprises fibers having an average length of from about 0.005 mm to about 100 mm, and an average diameter of from about 1 μm to about 100 μm.

2. The composition of claim 1, wherein the colloidal silica comprises a siliceous component selected from the group consisting of ethyl silicate, fumed silica, ionic silicates, precipitated silica, and combinations thereof.

3. The composition of claim 1 wherein the polymer comprises at least one monomer selected from the group consisting of acrylic acid, acrylic esters, methacrylic acid, methacrylic esters, styrene butadiene, vinyl chloride, vinyl acetate, and combinations thereof.

4. The composition of claim 1, wherein the wood pulp is selected from the group consisting of hardwood pulp, softwood pulp, and combinations thereof.

5. The composition of claim 1, wherein the engineered binder further comprises at least one cellulosic fiber derived from a plant substance selected from the group consisting of bamboo, cotton, cotton linters, bagasse, esparto, kenaf, jute, hemp, papyrus, flax, sisal, straw, rice, wheat, maize-derived, cellulose, and combinations thereof.

6. The composition of claim 1, wherein the wood pulp is present in the composition at a concentration of from about 0.01 wt % to about 20 wt %, based on a total mass of the composition.

7. The composition of claim 1, wherein the refractory flour comprises a compound selected from the group consisting of fused silica, aluminosilicate, alumina, zirconium silicate, microsilica, zirconia, yttria, quartz, carbon, and combinations thereof.

8. The composition of claim 1, wherein the refractory flour has an average particle size from about 0.5 µm to about 1 mm.

9. The composition of claim 1 wherein the engineered binder further comprises an ingredient selected from the group consisting of a biocide, a fungicide, a defoamer, a dispersant and combinations thereof.

10. The composition of claim 1, wherein the wood pulp has been pulped and bleached to selectively remove polymeric components that are present in native wood.

11. The composition of claim 1, wherein the wood pulp has been pulped chemically, thermomechanically, or chemi-thermomechanically.

12. The composition of claim 1, wherein the engineered binder is present in the composition at a concentration of from 35.8 wt % to 38 wt % based on the composition.

13. The composition of claim 1, wherein the composition consists of from 74 wt % to 76 wt % total solids based on the composition.

14. The composition of claim 1, wherein the engineered binder further comprises additional fiber selected from the group consisting of an organic fiber, an inorganic fiber, and combinations thereof.

15. The composition of claim 14, wherein the additional fiber is selected from the group consisting of polypropylene, nylon, ceramic, glass, and combinations thereof.

* * * * *

UNITED STATES PATENT AND TRADEMARK OFFICE
CERTIFICATE OF CORRECTION

| | | |
|---|---|---|
| PATENT NO. | : 9,227,241 B2 | Page 1 of 1 |
| APPLICATION NO. | : 12/963311 | |
| DATED | : January 5, 2016 | |
| INVENTOR(S) | : Sankar Bhattachrja | |

It is certified that error appears in the above-identified patent and that said Letters Patent is hereby corrected as shown below:

Claims

Column 13, claim 5, line 8-9, please change "maize-derived, cellulose, and" to --maize, and--

Signed and Sealed this
Nineteenth Day of April, 2016

Michelle K. Lee
*Director of the United States Patent and Trademark Office*